United States Patent
Doner et al.

(10) Patent No.: US 6,246,333 B1
(45) Date of Patent: Jun. 12, 2001

(54) APPARATUS FOR SENSING FLUID FLOW AND ASSOCIATED LOAD CONTROL CIRCUIT

(75) Inventors: Thomas O. Doner, Cary, IL (US); George J. McHugh, Broomall, PA (US)

(73) Assignee: AGF Manufacturing, Inc., Malvern, PA (US)

( * ) Notice: Subject to any disclaimer, the term of this patent is extended or adjusted under 35 U.S.C. 154(b) by 0 days.

(21) Appl. No.: 09/225,344

(22) Filed: Jan. 5, 1999

(51) Int. Cl.$^7$ .................................................... G08B 21/00
(52) U.S. Cl. ................................. 340/686.1; 324/207.2; 340/606; 137/554
(58) Field of Search ............................ 340/686.1, 309.15, 340/606; 137/554, 551; 324/207.2; 307/94

(56) References Cited

U.S. PATENT DOCUMENTS

| | | | |
|---|---|---|---|
| 3,176,284 | 3/1965 | Jones et al. | 340/530 |
| 3,597,632 | 8/1971 | Vandemore et al. | 327/393 |
| 3,623,088 | 11/1971 | Peterson | 340/529 |
| 3,625,289 | 12/1971 | Gloeckler | 169/39 |
| 3,633,676 | 1/1972 | Gloeckler | 169/40 |
| 3,688,130 | 8/1972 | Granieri | 327/449 |
| 3,713,126 | 1/1973 | Stettner | 340/527 |
| 3,715,623 | 2/1973 | Szabo | 327/457 |
| 3,715,700 | 2/1973 | Gloeckler | 337/407 |
| 3,740,585 | 6/1973 | Squiers | 327/456 |
| 3,742,337 | 6/1973 | Digneffe | 327/457 |
| 3,745,382 * | 7/1973 | Hoge et al. | 307/571 |
| 3,746,887 | 7/1973 | Lorenz | 327/455 |
| 3,749,864 | 7/1973 | Tice | 200/81.9 |
| 3,756,321 | 9/1973 | Gloeckler | 169/40 |
| 3,764,832 | 10/1973 | Stettner | 327/392 |
| 3,779,004 | 12/1973 | Gloeckler | 59/93 |
| 3,794,858 | 2/1974 | Squiers | 327/143 |
| 3,846,648 | 11/1974 | Scott | 327/392 |
| 3,857,277 * | 12/1974 | Moore | 73/28 |

(List continued on next page.)

OTHER PUBLICATIONS

Potter Electric Signal Company; Thornhill, Ontario, Canada; Switch Brochure, Dec., 1995.

Clare Reed Switches Brochure, pp. 48 and 53.

*Primary Examiner*—Julie Lieu
(74) *Attorney, Agent, or Firm*—Burns, Doane, Swecker & Mathis, LLP (57) ABSTRACT

A circuit and apparatus for magnetically sensing fluid flow and applying voltage to a load. A valve disposed within a conduit is provided with a magnetic shield. A magnet is located on one side of the magnetic shield while a sensor, associated with the valve is located on the opposite side of the magnetic shield. The valve, and hence the magnetic shield, moves to permit fluid flow. When the magnetic shield moves due to fluid flow, the magnet activates the sensor. A load control circuit includes a supply terminal for receiving a supply voltage and a detector which detects a condition requiring the operation of a load. The detector causes a threshold voltage to be generated from the supply voltage, and a time delay controller controls the time required to generate the threshold voltage. A DIAC or equivalent element conducts to generate a first trigger signal once the threshold voltage is achieved, and a silicon-controlled rectifier (SCR) generates a second trigger signal in response to the first trigger signal. The circuit includes an opto-TRIAC and triac which are rendered conductive by the second trigger signal to cause a voltage to be provided to the load.

11 Claims, 7 Drawing Sheets

U.S. PATENT DOCUMENTS

| | | | |
|---|---|---|---|
| 3,874,456 | 4/1975 | Gloeckler | 169/39 |
| 3,896,850 | 7/1975 | Waltrip | 137/554 |
| 3,906,641 | 9/1975 | Freeman | 33/363 R |
| 3,921,989 | 11/1975 | Ward | 277/173 |
| 3,940,634 | 2/1976 | Grogan | 327/451 |
| 3,946,691 | 3/1976 | Freeman | 318/588 |
| 4,103,294 | 7/1978 | Stettner et al. | 367/136 |
| 4,152,608 | 5/1979 | Nakasone et al. | 327/402 |
| 4,319,236 | 3/1982 | Brace et al. | 340/679 |
| 4,331,914 | 5/1982 | Huber | 327/457 |
| 4,353,390 | 10/1982 | Karpenko | 137/527.8 |
| 4,382,192 | 5/1983 | Mendelson | 307/141.4 |
| 4,458,239 | 7/1984 | Willey et al. | 340/540 |
| 4,586,893 | 5/1986 | Somerville et al. | 431/76 |
| 4,745,311 * | 5/1988 | Iwasaki | 307/632 |
| 4,757,865 | 7/1988 | Simons | 169/39 |
| 4,791,254 | 12/1988 | Polverari | 200/81.9 M |
| 4,831,350 | 5/1989 | Rose | 335/205 |
| 4,866,426 | 9/1989 | Evans et al. | 340/568 |
| 4,914,566 | 4/1990 | Steutermann | 364/167.01 |
| 4,963,857 | 10/1990 | Sackett | 340/606 |
| 4,977,963 | 12/1990 | Simons | 169/37 |
| 4,987,957 | 1/1991 | Galaszewski | 169/37 |
| 5,036,234 | 7/1991 | Friedrich et al. | 327/457 |
| 5,038,820 | 8/1991 | Ames et al. | 137/486 |
| 5,063,775 | 11/1991 | Walker, Sr. et al. | 73/155 |
| 5,072,792 | 12/1991 | Simons et al. | 169/40 |
| 5,086,273 | 2/1992 | Leon | 324/207.17 |
| 5,140,263 * | 8/1992 | Leon | 324/207.17 |
| 5,195,592 | 3/1993 | Simons | 169/37 |
| 5,198,973 | 3/1993 | Steutermann | 364/167.01 |
| 5,234,059 | 8/1993 | Eynon | 169/39 |
| 5,236,011 * | 8/1993 | Casada et al. | 137/554 |
| 5,305,787 | 4/1994 | Thygesen | 137/527 |
| 5,323,062 | 6/1994 | Crawford et al. | 327/455 |
| 5,372,203 | 12/1994 | Galaszewski | 169/37 |
| 5,400,446 | 3/1995 | Bloemer et al. | 4/408 |
| 5,406,979 | 4/1995 | McHugh | 137/557 |
| 5,504,426 | 4/1996 | Ricci et al. | 324/207.17 |
| 5,523,682 | 6/1996 | Leon | 324/207.17 |
| 5,589,769 | 12/1996 | Krahn | 324/207.26 |
| 5,621,317 * | 4/1997 | Wozniak | 324/207.13 |
| 5,632,339 | 5/1997 | Fenske et al. | 169/37 |
| 5,705,987 | 1/1998 | Doner | 340/606 |
| 5,723,918 | 3/1998 | Schilling et al. | 318/282 |
| 5,889,400 * | 3/1999 | Nakazawa | 324/207.2 |
| 6,113,642 | 9/2000 | Petrofsky et al | 623/24 |

* cited by examiner

APPARATUS FOR SENSING FLUID FLOW AND ASSOCIATED LOAD CONTROL CIRCUIT

FIELD OF THE INVENTION

The present invention relates to an apparatus for sensing fluid flow through a conduit and controlling a load based upon the sensing of the fluid flow. More specifically, the present invention is directed toward a fluid flow sensor and a load control circuit employing a variable time delay to control activation of an alarm circuit in a fire protection system.

BACKGROUND OF THE INVENTION

Numerous control circuits have been designed to apply a voltage or current to an electrical load after a time delay. Examples of such circuits are disclosed in U.S. Pat. No. 3,745,382 to Hoge et al., U.S. Pat. No. 3,597,632 to Vandemore, and U. S. Pat. No. 3,764,832 to Stettner. However, these and other known control circuits are relatively complicated and have numerous components, thus increasing manufacturing difficulty and costs. Further, these and other known control circuits typically provide relatively lengthy time delays, on the order of five minutes, and are unreliable when needed to be reduced to a lesser amount of time.

Control circuits are used in a variety of applications including, for example, to activate an alarm circuit in a fire protection system. Conventional fire protection systems typically include a source of water or other fire-extinguishing fluid, a detector for detecting the flow of the fire extinguishing fluid through a pipe or conduit, and an alarm circuit or other load that is activated when a sufficient flow is detected.

In such systems, the alarm is preferably not activated immediately upon detection of fluid flow in the conduit, because flow may occur due to a "water hammer" or fluid backwash within the system. If the alarm were activated immediately upon detection of a water flow, a large number of false alarms would result.

In order to reduce or eliminate such false alarms, a control circuit can delay the activation of the alarm for a predetermined time following detection of an alarm condition. Early detection and control circuits included simple mechanical devices, such as dashpots in which air was forced into and out of a chamber. The alarm would not sound until the air was completely out of the chamber, at which time a switch would close to activate the alarm.

These and other conventional detection mechanisms were designed to provide a delay in the range of 30 seconds to 90 seconds. However, these devices were unreliable and inaccurate, and were thus unsuccessful in eliminating false alarms. Accordingly, solid state electrical load control circuits were developed for fire protection systems such as the time delay circuit known as ICM/HMKS-W1104. These electrical load control circuits delay activation of the alarm until an electrical sensor or switch is rendered conductive.

It would be desirable to provide a relatively simple, reliable, and easy-to-install sensor circuit with minimal current draw, in order to detect a condition (such as fluid flow) which requires activation of a load such as an alarm. While certain flow sensing devices are known, such as those described in U.S. Pat. No. 3,749,864 to Tice, U.S. Pat. No. 4,791,254 to Polverari and U.S. Pat. Nos. 5,086,273 and 5,140,263 to Leon, these and other similar devices include relatively complex arrangements of moving parts. In addition, it would also be desirable to provide an accurate load control circuit which delays activation of a load by using an integrated circuit.

SUMMARY OF THE INVENTION

The present invention solves the foregoing problems, and provides additional advantages, by providing an apparatus for sensing fluid flow through a fluid-carrying conduit. According to exemplary embodiments of the present invention, a valve such as a flapper valve disposed within the conduit is provided with a magnetic shield. A magnet is located on one side of the magnetic shield while a sensor, associated with the valve is located on the opposite side of the magnetic shield. The valve, and hence the magnetic shield, moves to permit fluid flow. When the magnetic shield is removed from between the magnet and sensor, the magnet activates the sensor. Thus the sensor, which can be a Hall effect sensor, generates a signal when the valve is opened to permit fluid flow.

According to one aspect of the present invention, the sensor and magnet can both be encased in a tube sealed with substantially watertight material and inserted into the conduit (e.g., by threading the encased sensor through a threaded pipe opening) near the valve.

In another exemplary embodiment of the present invention, a load control circuit includes a supply terminal for receiving a supply voltage and a detector which detects a condition requiring the operation of a load. The detector causes a threshold voltage to be generated from the supply voltage, and a time delay controller controls the time required to generate the threshold voltage. A DIAC or equivalent element conducts to generate a first trigger signal once the threshold voltage is achieved, and a silicon-controlled rectifier (SCR) generates a second trigger signal in response to the first trigger signal. The load control circuit includes an opto-TRIAC and a TRIAC or similar switches which are rendered conductive by the second trigger signal to cause a voltage to be provided to the load. According to an alternate embodiment of the present invention, multiple electrically isolated loads can also be controlled.

If the supply voltage is an AC (alternating current) voltage, the load control circuit also includes a rectifying diode or equivalent element for converting the AC voltage to a DC (direct current) voltage. The time delay controller may include a potentiometer (variable resistor) to vary the delay time required to generate the threshold voltage. Additionally, the time delay controller can be implemented via a digital implementation. When digitally employed, a dip switch is used in combination with a digital control to vary the amount of time delay from zero to ninety seconds.

For implementation in a fire protection system in accordance with the present invention, the detector may be a magnet operated reed switch, or a Hall effect sensor, for detecting a threshold fluid flow in a conduit and the load is an alarm for indicating the threshold flow in the pipe.

BRIEF DESCRIPTION OF THE DRAWINGS

The features and advantages of the present invention will be more fully understood upon reading the following Detailed Description of the Preferred Embodiments in conjunction with the accompanying drawings, in which like reference indicia indicate like elements, and in which.

DETAILED DESCRIPTION OF THE PREFERRED EMBODIMENTS

Figure 1:
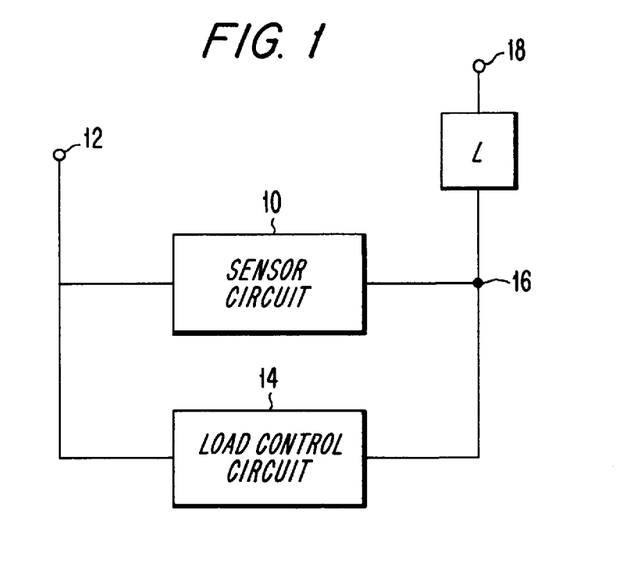
FIG. 1 illustrates a block diagram of the sensor circuit and load control circuit in accordance with an exemplary embodiment of the present invention.

Referring now to FIG. 1, an exemplary embodiment of an alarm circuit according to the present invention is shown. A sensor circuit 10 is implemented in a fire protection circuit. The fire protection circuit also includes a load control circuit 14 which further comprises a delay circuit for controlling the activation of a load such as an alarm circuit in a fire protection system. In such a system, the flow of water or other fire suppression fluid through the pipes of a building sprinkler system (to prevent or minimize fire damage) is detected, causing a switch to close and apply an operating voltage to the alarm circuit after a time delay to guard against false alarms.

According to the invention, sensor circuit 10 is connected as shown between a neutral wire 12, an input of a load control circuit 14, and a terminal 16 of a load L (e.g., an alarm, which can be embodied by one or more lights, sirens, motors, solenoids, or other loads) which is connected between a power input terminal 18 and the load control circuit 14. The power input terminal receives an input voltage of, for example, 24–130 volts A.C. The sensor circuit 10 senses fluid flow through a pipe, and when fluid flow is sensed, the sensor circuit 10 generates an output signal and supplies this signal to the load control circuit 14. The load control circuit 14 then operates to apply the supply voltage across the terminals 12 and 18, thereby applying the supply voltage to the load 16 and activating the alarm. The sensor circuit 10 can be implemented using a Hall effect sensor or other suitable sensor such as a reed switch, as will be described in more detail with respect to FIGS. 2–4 below. It will be appreciated that the time delay circuit is useful for preventing false alarms.

Fluid flow can be sensed by the use of a sensor, (e.g. Hall effect sensor), a magnetic shield, and a magnet used in combination. The particular Hall effect sensor discussed above is approximately 3/16"×3/16"×1/16", and the magnet can have a 1/4" diameter and a thickness of 1/8". Due to the relatively small size of both the Hall Effect sensor and the magnet, each element can be inserted into a threaded tube (made of, e.g., plastic), and the tubes can be covered with epoxy or some other suitable material to provide a substantially watertight seal for the contents of the tubes. Each of the threaded tubes can then be rotated into the fluid-carrying conduit through a threaded orifice in the conduit such that the end of each tube, one containing the sensor and one containing the magnet are located in close (e.g., within approximately 1/8") proximity to each other. Alternatively, the tubes need not be threaded. The tubes containing the sensing device and magnet can be lowered down through holes to ensure that they are correctly positioned, and tightened through the use of a nut or rubber gasket.

Figure 2:
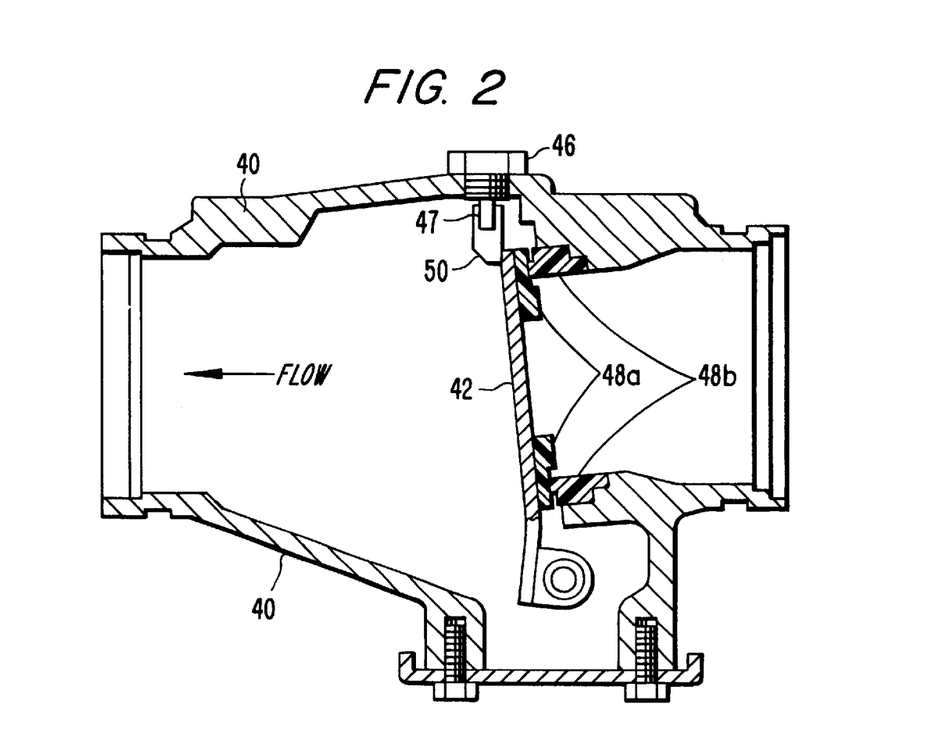
FIG. 2 illustrates a schematic diagram showing an exemplary implementation of a fluid flow sensor of the present invention.
Figure 3A:
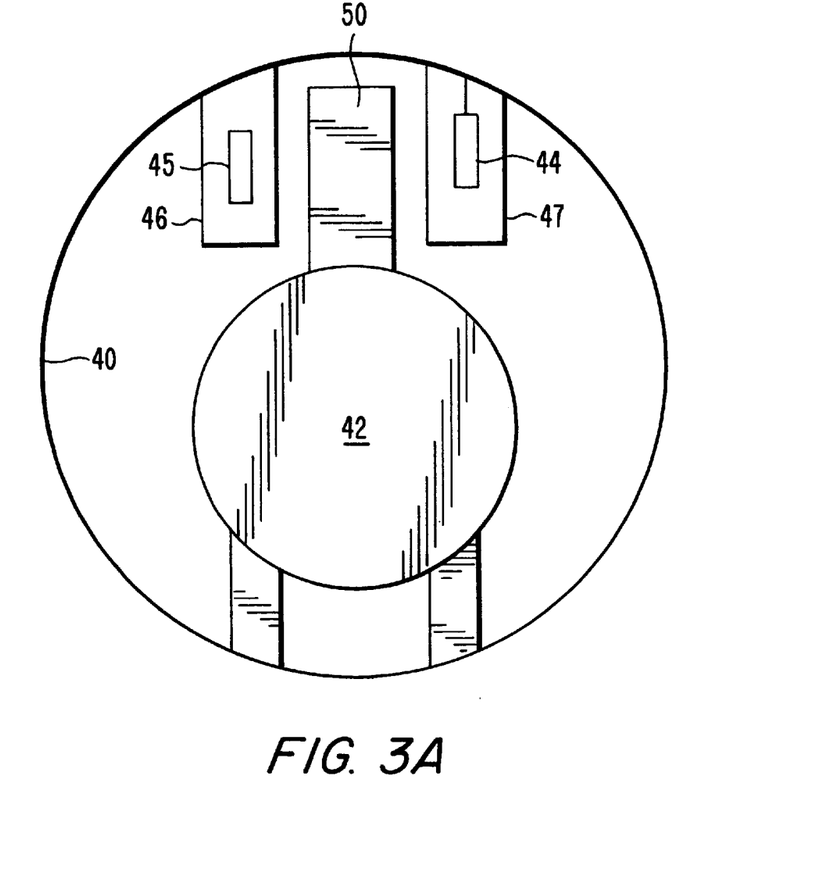
FIGS. 3A and 3B illustrate schematic diagrams of the fluid flow sensor and the magnetic shield in accordance with an exemplary embodiment of the present invention.

FIG. 2 illustrates a (not to scale) view of a tube 47 inserted into a pipe defined by pipe wall 40, and having a check valve with a hinged clapper 42. The pipe contains a fluid flowing in the direction indicated by the flow arrow. Threaded tubes 46 and 47 (shown in FIG. 3A) are inserted into similarly-threaded holes in pipe wall 40 and this connection is sealed by a suitable seal 46. The tube 47 includes a Hall Effect sensor 44 and is encased in a suitable substantially water-tight material. Tube 46 (not shown in FIG. 2) includes the magnet 45 which is encased in a suitable substantially water-tight material. Hinged clapper 42 is provided with sealing portions 48a which cooperate with corresponding portions 48b of the pipe 40 when the clapper is in a closed position. Magnetic shield 50 is attached to the hinged clapper 42 so that the magnet is prevented from actuating the Hall Effect sensor 44 when there is no flow of water through a valve. As shown in FIGS. 2 and 3A, the magnetic shield 50 is located between the encased magnet 45 and Hall Effect sensor 44. While the magnetic shield 50 can be made of any material that is able to shield the magnetic field of the magnet from the sensor, it is advantageous for the material to be composed of approximately 3 percent Nickel Iron to prevent oxidation of the shield.

Figure 3B:
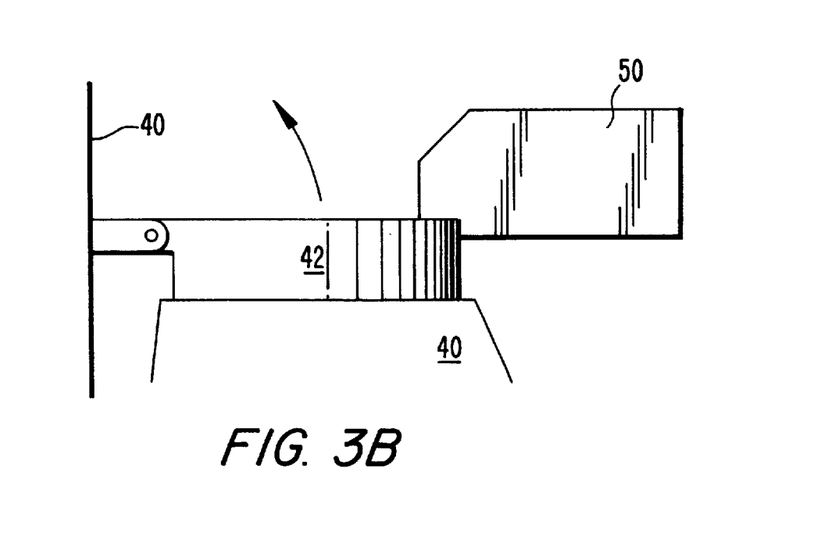

As illustrated in FIG. 3B, when there is substantially no fluid flow in the pipe, hinged clapper valve 42 is in a closed position as its associated magnetic shield 50 is positioned between the encased Hall Effect 44 sensor and the magnet 45 to substantially neutralize the magnet 45. When there is fluid flow within the pipe, the flapper valve 42 is moved in the direction of the flow arrow shown in FIG. 2, and the magnetic shield 50 is moved away from the Hall effect sensor 44 and magnet 45, thereby freeing the magnet to bias the sensor such that the sensor conducts to enable the operation of the sensor circuit 10 and load control circuit 14. The remainder of the sensor circuit 10 can consist of three additional components (such as a zener diode, a capacitor and resistor) which act as a power supply to the Hall effect sensor. These elements are described in detail in commonly assigned application Ser. No. 09/001,216, incorporated herein by reference. Additionally, the sensor circuit 10 can also include an indicator circuit also described in detail in the above-mentioned commonly assigned application.

Figure 4:
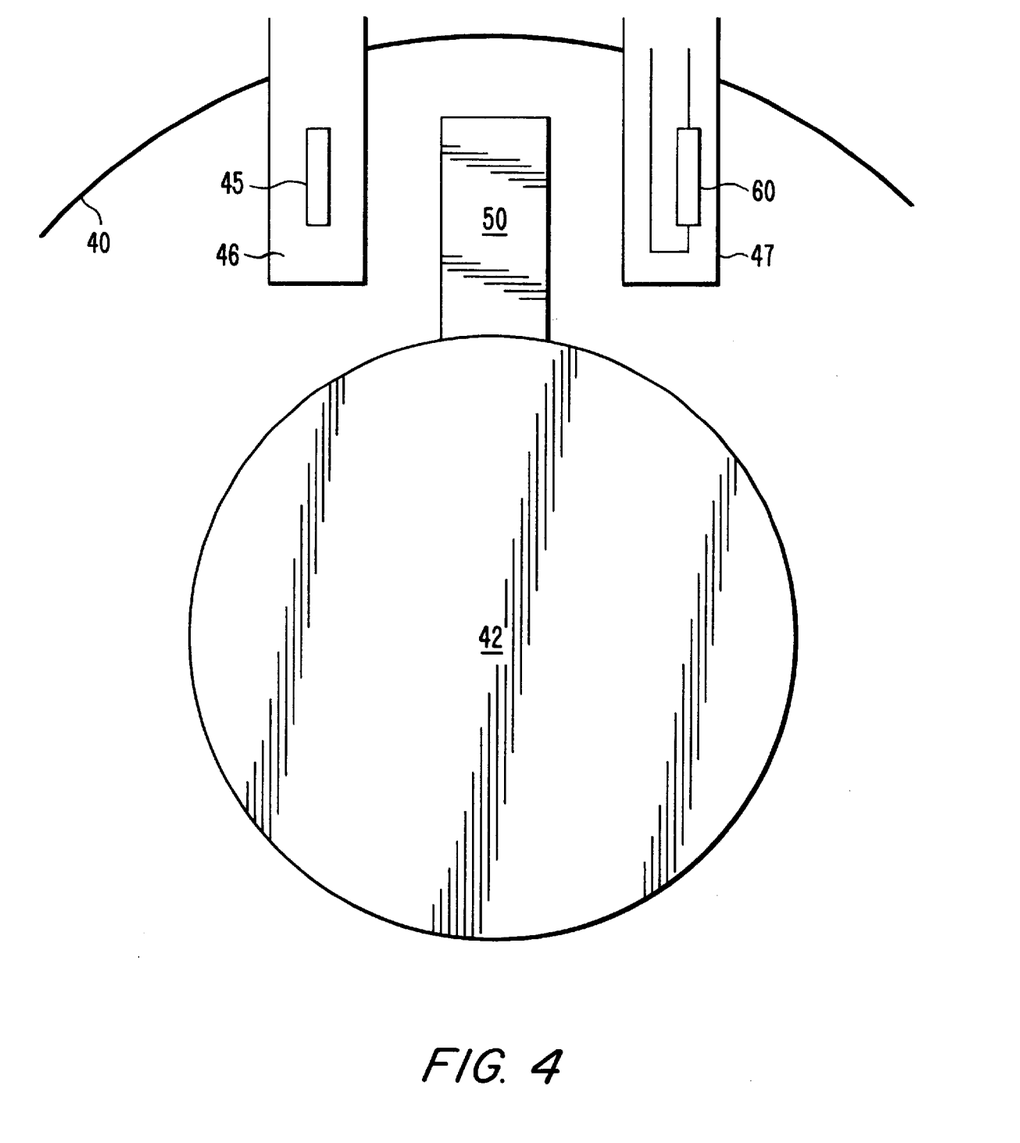
FIG. 4 illustrates a schematic diagram of a reed switch in accordance with an exemplary embodiment of the present invention.

It should be appreciated that the sensor of the sensor circuit 10 illustrated in FIG. 1 can alternatively be embodied by a reed switch associated with a magnet such that motion of the valve or other indication of fluid flow causes the reed switch to close, thereby supplying an input to the time delay circuit 14. The reed switch is set up within the valve in the same manner as described above with respect to the Hall effect sensor. However, the manner in which the switch is activated differs slightly. As illustrated in FIG. 4, a reed switch 60 encased in tube 47, in this embodiment, can be biased in an "on" (conductive) state by its associated magnet 45 encased in tube 46. The reed switch 60, as is known within the art, consists of two electrodes maintained within a glass tube. When a magnet is close to the reed switch 60, the magnet attracts the reed switch electrodes to contact and thus provide a closed circuit. As illustrated in FIG. 4, the reed switch magnet 45 is substantially neutralized by the use of the magnetic shield 50 when the valve is in a closed (no fluid flow) state. When the magnetic shield 50 is removed from the reed switch, the magnet 45 causes the reed switch 60 to close thereby providing power to the sensor circuit 10 and load circuit 14. This alternative has the advantage of lower cost and a reduced number of parts when compared to employing the Hall effect sensor.

It should also be appreciated that the sensor circuit 10 of the present invention can also be implemented using a push-button or pressure switch, such as in commonly used to provide interior lighting control for example, a refrigerator or automobile door. In such an embodiment, the closed clapper of the valve exerts pressure on the pressure-sensitive switch to indicate an open condition (that is, would provide no output to the delay circuit). When the valve is opened, indicating fluid flow through the pipe, the pressure exerted by the clapper on the pressure switch is reduced or eliminated and would indicate a closed condition (that is, would provide an indicator signal to the delay circuits). It should also be appreciated that alternative conventions of the reed switch can be used (i.e., the sensor switch can be a normally open or normally closed).

Figure 5:
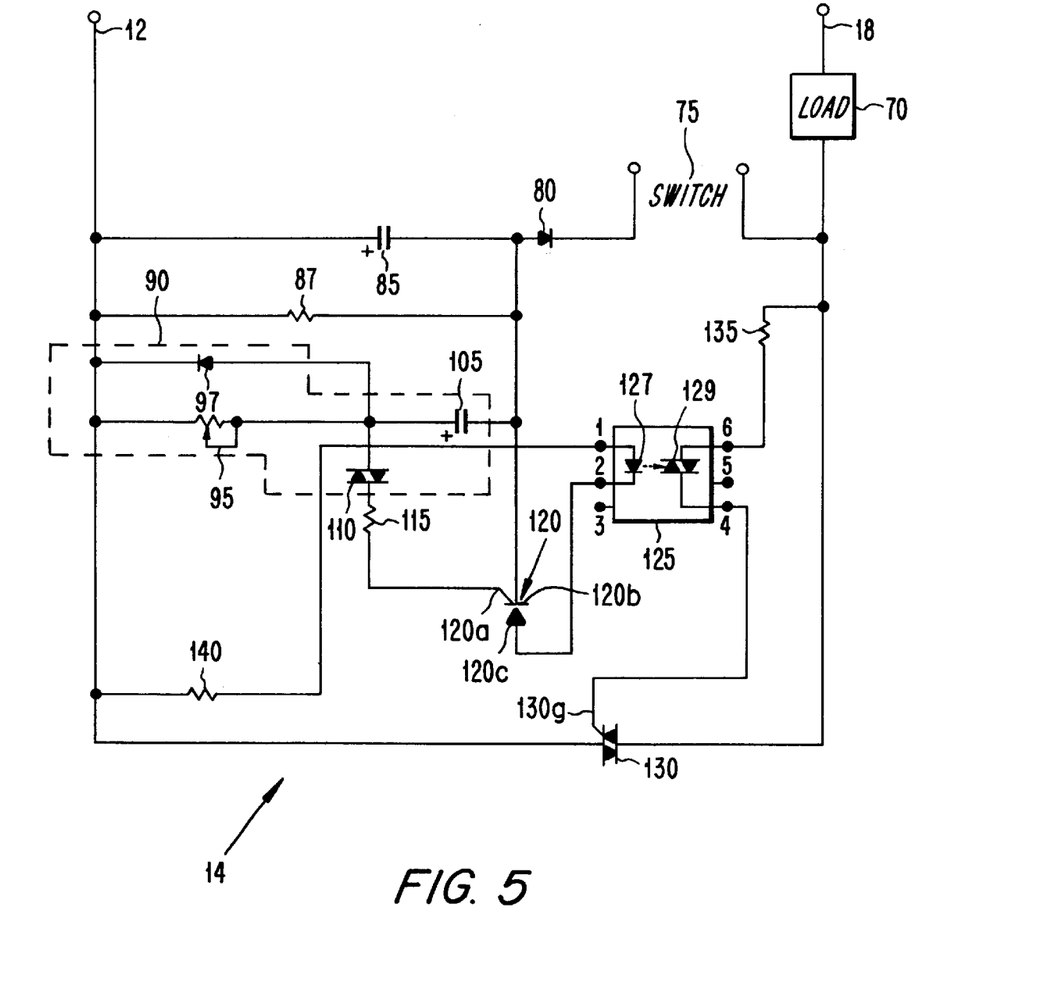
FIG. 5 illustrates a circuit diagram illustrating the load control circuit in accordance with an exemplary embodiment of the present invention.

Referring to FIG. 5, according to another embodiment of the present invention load control circuit 14 is shown in detail. The load control circuit includes a neutral terminal 12 connected to ground and a supply terminal 18 connected to a standard A.C. power source of between 30 and 120 volts at 60 Hz. A load 70 is connected to the supply terminal 18 to receive the supply voltage. The load control circuit 14 is connected between the load 70 and the neutral terminal 12 to selectively connect the load between the supply terminal 18 and the neutral terminal 12. In this embodiment, it is assumed that the load 70 draws a maximum of 6 amps; it will be readily appreciated that the circuit may be readily modified to accommodate loads having a current draw greater than 6 amps. The load control circuit 14 includes a switch 75, a diode 80, and a first capacitance 85 connected in series between the load 70 and the neutral terminal 12. In a preferred embodiment, the diode 80 is a 1N4005 diode, and the first capacitance 85 is a 33 micro farad (MFD) capacitor rated at 160 volts D.C. (VDC). It will be appreciated that other suitable diodes and other suitable charge storing elements may be used for diode 80 and first capacitance 85, respectively.

The first capacitor 85 is connected in parallel to a resistance 87. A second capacitance 105 and a time delay setting circuit 90 are connected in series, in a circuit path that is in parallel with resistance 87 and in parallel with first capacitance 85. Resistance 87 functions to discharge capacitance 85 when operation of the load control circuit is completed. Resistance 87 can be a fixed 10 kilo ohm (kΩ) resistor rated for 2 watt (W) or other suitable resistor. The second capacitance 105 may be a 47 MFD capacitor rated at 50 VDC or other suitable charge storing element.

Time delay circuit 90 includes two paths. The first path includes diode 97 while the second path includes a potentiometer 95. The potentiometer 95 functions to adjustably control the charging rate of capacitor 105 to delay activation of the load 70.

The time delay circuit 90 further includes a DIAC 110. The DIAC 110 is preferably an MBS 4991 DIAC having a trigger voltage of 10 volts, though any suitable triggering element may be used. As will be appreciated by those skilled in the art, a DIAC (DIode AC switch) is a bidirectional diode which may be rendered conductive when a "breakover" or "trigger" voltage is exceeded in either direction by an applied voltage or trigger spike. Suitable DIACs are available from numerous suppliers, including Motorola Corporation.

The DIAC 110 is connected to a gate 120*a* of a silicon controlled rectifier (SCR) 120 through a resistance 115. The resistance 115 may be a fixed 690Ω resistor rated for 0.5 watts or other suitable resistance element. SCR 120 is preferably an EC103B SCR, available from numerous manufacturers, including the Teccor Corporation of Dallas, Tex. The anode 120*b* of the SCR 120 is connected to the cathode of the second capacitor 105, resistance 87, and between the cathode of first capacitance 85 and the cathode of the diode 80. The cathode 120*c* of the SCR 120 is connected to pin 2 of an MOC3020 opto-TRIAC 125. As a result, light emitting diode 127 connected between pins 1 and 2 of opto-TRIAC 125 is caused to emit light thereby exciting optical triac 129 connected between pins 4 and 6 of opto-TRIAC 125. Pin 1 of the light emitting diode is connected via resistor 140 to neutral line 12. Once optical triac 129 is excited, a trigger pulse is provided to the gate of triac 130. The pulse is supplied via the load 70 in series with resistor 135. Triac 130 then turns on the load 70. Resistor 135 can be a fixed 100 ohm resistor or other suitable resistance element.

As will be appreciated by those skilled in the art, a silicon controlled rectifier (SCR) is rendered conductive when a proper signal is applied to its gate. The SCR remains conductive when the gate signal is removed, and is turned off by removing the anode voltage, reducing the anode voltage below the cathode voltage, or making the anode voltage negative, as on the alternate half-cycles of an A.C. power source. A TRIAC (TRIode AC switch) is a gate-controlled bidirectional thyristor or SCR which is rendered conductive in both directions when a proper signal is applied to its gate. TRIAC 130 is preferably a Q4006L4 TRIAC available from numerous suppliers including Teccor Corporation.

The load control circuit of FIG. 5 may be used, for example, in a fire suppression system. In such an arrangement, the switch 75 may be a Hall effect transistor in combination with a power supply circuit as described above or a magnet operated reed switch on a vane type water flow detector as discussed above with respect to FIG. 4, and the load 70 may be an alarm circuit which causes bells, horns, lights, etc., to be activated in response to a threshold fluid flow in a conduit with a reed switch. It will be appreciated that the circuit of the present invention may be used in connection with other types of switches or detectors and/or with other types of loads. Suitable reed switches are available from numerous suppliers, including the C. P. Clare Corporation of Chicago, Ill. and the Hammlin Corporation of Lake Mills, Wis.

Using the example of a fire suppression system, the operation of the load control circuit 14 of the present invention will now be described. When water or fire extinguishing fluid starts to flow through the pipes of a sprinkler system in a building to prevent fire damage, a small permanent magnet as described above is enabled to activate switch 75 to cause closure.

The closing of the switch 75 contacts applies the supply voltage potential to the rectifying diode 80. In the embodiment of FIG. 1, the supply voltage is between 24 and 120 volts A.C. (alternating current).

The diode 80 rectifies the alternating current to provide a half wave rectified current equivalent to a D.C. (direct current) voltage which rapidly charges capacitance 85 to a voltage of about 160 volts D.C. (based on an input voltage of 120 volts A.C.). Diode 80 and capacitance 85 thus have the effect of converting the A.C. voltage source into a D.C. power source. It will be appreciated that if a D.C. power source with correct polarity is used, a rectifying function does not need to be performed, and the diode 80 is therefore unnecessary. In this case, the closing of the switch causes capacitance 85 to be rapidly charged directly by the power source.

The charge stored by capacitance 85 slowly charges the second capacitance 105 through potentiometer 95 and resistance 100. It will be appreciated that an RC circuit is formed by second capacitance 105, potentiometer 95, and fixed resistor 100, and that the RC time constant and thus the charge time of capacitance 105 may be adjusted by potentiometer 95. According to one embodiment of the present invention, potentiometer 95 is a trim pot and allows the delay time of time delay circuit 90 to be adjustable between about zero seconds and approximately 90 seconds. A dial or other input device (such as a screw head slot, not shown) connected to the potentiometer 95 may be used to adjust the resistance and thus the time delay. Diode 93 discharges capacitor 105 when power is removed.

If not for the presence of DIAC 110, capacitance 105 would be charged to approximately 170 volts (based on a 120 volt A.C. supply voltage). However, when the charge stored in second capacitor 105 reaches 10 volts D.C., the break over voltage of DIAC 110 is achieved, causing DIAC 110 to conduct and generate a first trigger signal. The first trigger signal is supplied to gate 120a of SCR 120 through the resistor 115 which causes SCR 120 to conduct and generate a second trigger signal.

The SCR 120 renders a negative pulse on pin 2 of opto-TRIAC 125. The current through LED 127 thereby renders optical triac 129 conductive. When optical triac 129 is conductive, AC voltage is supplied to the TRIAC 130. The TRIAC 130 is rendered conductive in response to A.C. voltage generated by the closure of the optical triac 129. When the TRIAC 130 turns on, the A.C. voltage drop across the load control circuit 14 is only about 6 volts. The signal applied to the gate of TRIAC 130 is phase controlled such that TRIAC 130 is only about 95–98% conductive. If the TRIAC were 70% conductive, the voltage drop across the TRIAC would be greater than 6 volts, and the power supplied to the load would be reduced. If the voltage drop across the TRIAC is less than about 6 volts, the TRIAC may oscillate between conductive and non-conductive states, thus impairing operation of the load control circuit. It will be appreciated that the actual voltage drop across the TRIAC is approximately $6*(1/\sqrt{2})$ which equals approximately 4 volts RMS.

Because of the low voltage drop across the TRIAC, the load 70 receives a voltage substantially equal to the supply voltage potential received at terminals 12 and 18. If the supply voltage is 120 volts A.C., the load receives approximately 114 volts A.C., which is more than sufficient to operate horns, lights, motors, solenoids or any other component in the fire alarm circuit.

When the water or fire extinguishing fluid stops flowing, the switch opens and the capacitors 85 and 105 are discharged to ground. Capacitance 85 discharges through resistor 87 and neutral terminal 12, and capacitance 105 discharges through diode 97 and neutral terminal 12. It will be appreciated that other suitable elements may instead be used to allow the capacitances 85 and 105 to discharge. If capacitances 85 and 105 are not provided with an effective discharge path, any remaining charge stored on the capacitances will cause the delay time to be varied during a later operation of the circuit. Once capacitances 85 and 105 are discharged, the circuit is reset and ready for another load control operation.

Figure 6:
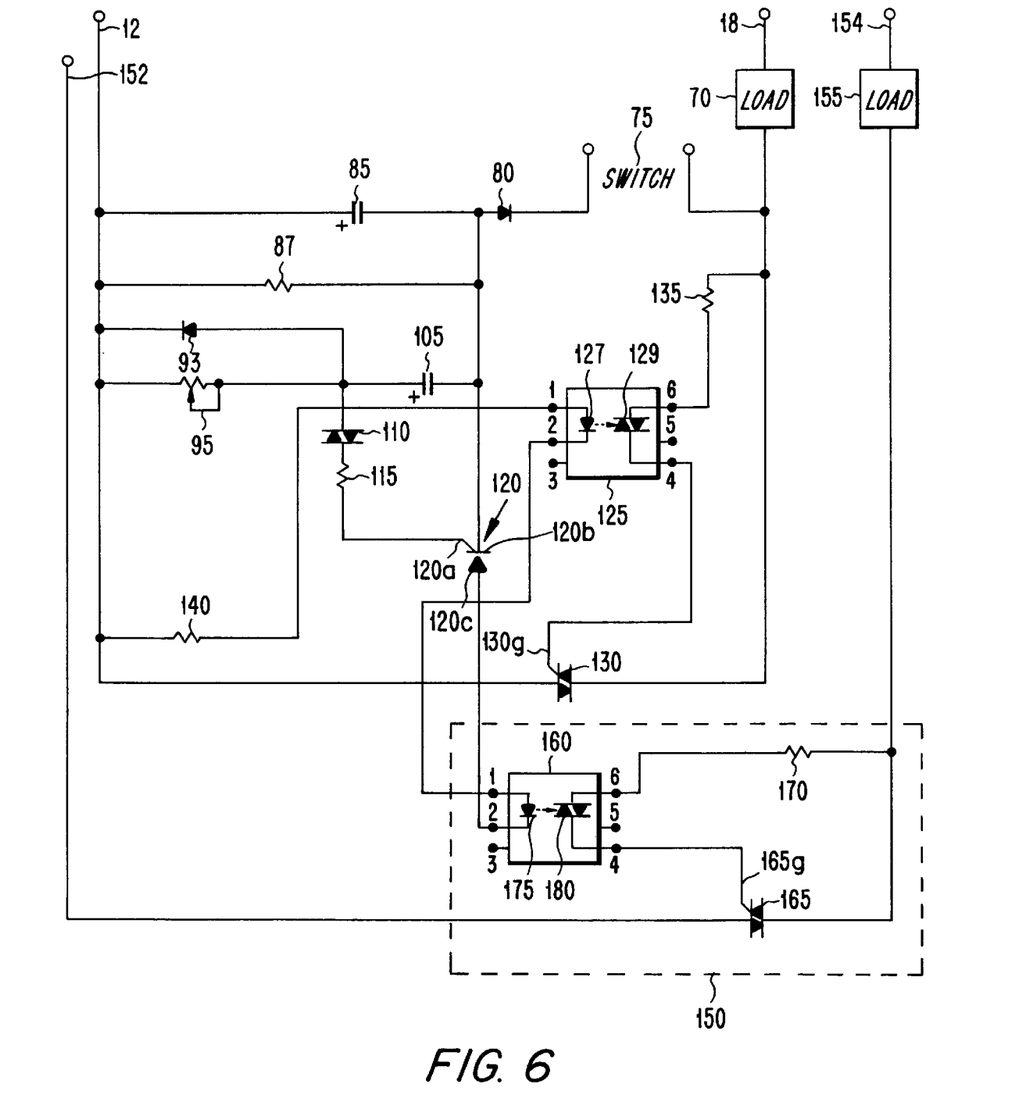
FIG. 6 illustrates a circuit diagram of the load control circuit with multiple loads in accordance with an exemplary embodiment of the present invention.

Referring now to FIG. 6, an alternate time delay circuit according to the present invention is shown. In the embodiment of FIG. 6, a voltage supply may be selectively applied after a time delay to a second load. The circuit includes a first circuit having substantially the same arrangement of components as in the embodiment of FIG. 5 connected between a first input terminal 18 and a first neutral line 12, and also includes a second circuit 150 connected between second load 155 located on input terminal 154 and second neutral line 152. Second circuit 150 includes opto-TRIAC 160, second TRIAC 165, and resistance 170, which is connected as shown. Second load 155 is connected to receive a second voltage supply via input terminal 154. In operation, once SCR 120 is rendered conductive in the manner described above, the charge stored by first capacitance 85 is discharged to provide a negative pulse to pin 2 of opto-TRIAC 160. As a result of the discharge of first capacitance 85, light-emitting diode (LED) 175, connected as shown between pins 1 and 2 of opto-TRIAC 160, is caused to emit light. The output of pin 1 of opto triac 160 is provided to pin 2 of opto TRIAC 125 as shown in FIG. 5. Thus light emitting diodes 127 and 175 are in series thereby causing each optical TRIAC 129 and 180 between pins pins 4 and 5 of opto-TRIACs 125 and 160, to conduct. The conduction of optical TRIACs 129 and 180 causes trigger pulses to be provided to the gates 130g and 165g of TRIACs 130 and 165, thereby rendering the TRIACs 130 and 165 simultaneously conductive and causing power to be applied to both the first and second load 70 and 155. Resistances 170 is a current-limiting resistor to limit the current applied to gate 165g of second TRIAC 165.

It will be appreciated that the first and second circuits in the time delay circuit of FIG. 6 are electrically isolated from one another, and therefore enable the time delay circuit to reliably control the operation of two loads. Because the first and second circuits are electrically isolated, the voltage sources connected to input terminals 18 and 154 may provide the same or different supply voltages. Alternatively, first and second neutral lines 12 and 152 may be the same neutral line. Further, input terminals 18 and 154 may be connected to the same voltage source.

Preferably, the supply voltages provided on input terminals 18 and 154 are between approximately 24 and approximately 120 volts A.C., and first and second loads 70 and 155 draw a current of no more than approximately 6 amps. Opto-TRIAC 160 can be a 3047 opto-TRIAC available from numerous suppliers, and second TRIAC 165 can be a Q4006L4 TRIAC available from numerous suppliers. Resistance 170 can be implemented by a 100Ω resistor. It will be appreciated that other suitable components can be used.

Further, it will also be appreciated that the addition of the second circuit 150 may require changes in the component values of the first circuit. In the embodiment of the circuit of FIG. 6, first capacitance 85 is a 33 microfarad capacitor rated for 160 volts D.C. Further, in the embodiment of FIG. 6, resistance 87 is preferably a 10 kΩ resistor rated for 2 watts. Additionally, capacitor 105 would be changed to a 2200 MFD capacitor rated at 16 VDC. Other component values remain the same. It will be appreciated that other suitable component values or components can be used for the time delay circuit of FIG. 6. It will further be appreciated that operation of more than two electrically isolated loads can be controlled according to a circuit of the type shown in FIG. 2.

In yet another exemplary embodiment of the present invention, the time delay circuit 90 employed within the load control circuits illustrated in FIGS. 5 and 6 can be implemented digitally. As illustrated in the FIG. 7 embodiment which shows a load control circuit controlling two loads, when the switch 75 is closed, AC voltage is applied to diode 80. The diode 80 changes the alternating current to direct current and charges the capacitor 85. The capacitor in combination with a 1N965A zener diode 205 and resistor 210 form a power supply for a programmable digital IC timer 215. The time delay can be adjusted by use of a dip switch 220. The dip switch 220 can comprise any multiple pole dip switch which can be set so that a wanted time delay will elapse. Also, resistance 225 and capacitance 230 on the output of the dip switch 220 and connected to the neutral node 12, form an oscillator circuit used with IC timers. The dip switch 220 adjustably controls timing the delay in the activation of load 70 in a range from 1 to 90 seconds. Upon timeout of the delay, a trigger signal is sent to SCR 120 via resistance 115 from digital IC timer 215. As described above, the SCR 120 receives the trigger signal and provides a path for the voltage stored in the capacitor 85 to the opto-TRIACs 125 and 160. The opto-triac conducts AC current in both directions providing power to the load. When the valve closes, the timer 215 immediately is reset and ready to initiate another time delay upon actuation of the switch again. With the implementation of the digital control the values of capacitor 85 would be changed to a 50 MF capacitor rated at 160 VDC while the resistance would optimally be a 3 Kilo-ohm resistor rated at 2 Watts or suitable resistance component. Additionally capacitor 227 is a 0.1 Micro-Farad capacitor while resistor 225 is optimally a 27 Kilo-ohm resistor or appropriate resistance element. All remaining elements within the multiple load control circuit remain the same values discussed with respect to FIG. 6.

Figure 7:
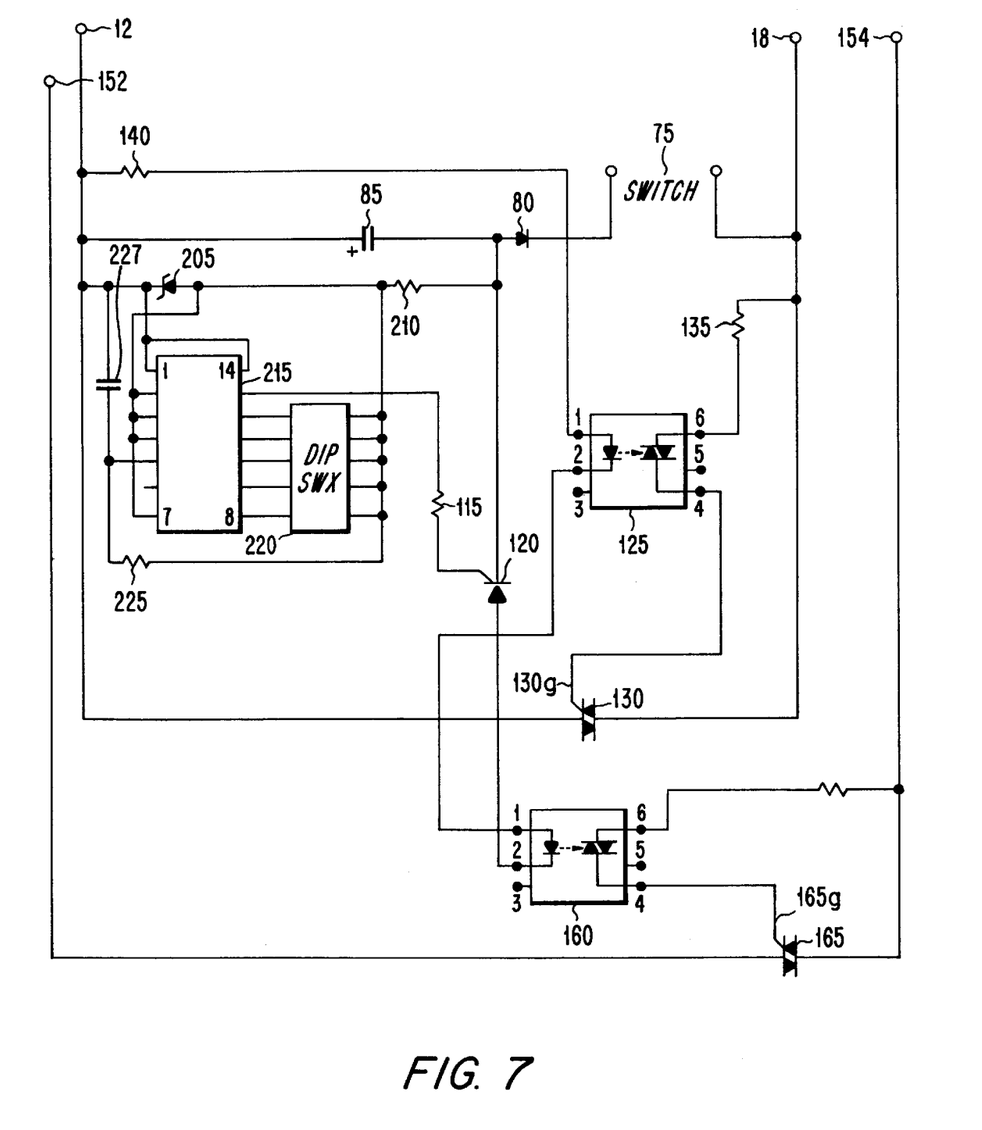
FIG. 7 illustrates a circuit diagram of the load control circuit implementing a digital time delay implementation in accordance with an exemplary embodiment of the present invention.

The digital timer, illustrated in FIG. 7 with multiple loads, would also be able to be implemented in a load control circuit containing a single load, illustrated with analog timing in FIG. 5. Of course, the elements would need to be modified (to the values described with respect to FIG. 5) in order to ensure proper operation.

Figure 8:
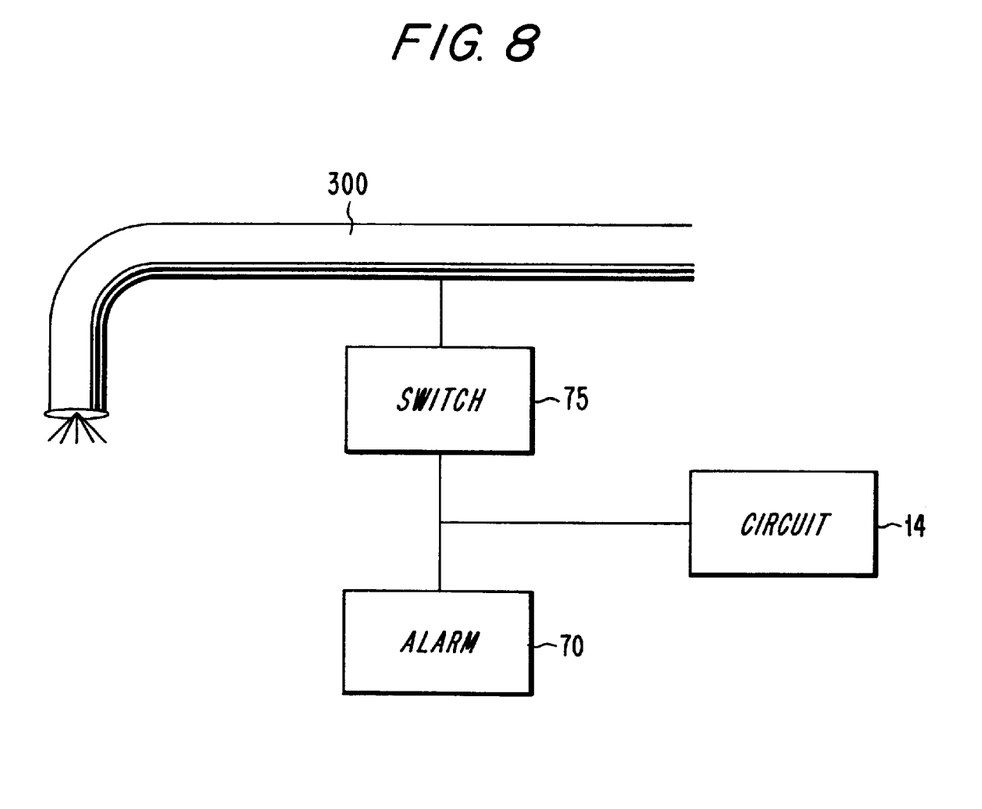
FIG. 8 illustrates a schematic diagram of a fire protection system in which the circuit of the present invention may be implemented.

Referring now to FIG. 8, a fire suppression system including a load control circuit 14 according to the present invention is shown. When sufficient water flow through pipe 300 is detected by switch 75, the switch closes the load control circuit 14 and causes a load, e.g., an alarm or warning light, to be turned on after a desired time delay. The time delay reduces false alarms by avoiding registration of an alarm condition which might occur due to back flow or other temporary movement of water in the pipe. The delay period is selectable by the user or manufacturer as described above to accommodate a given fire protection system. Of course, the time delay control circuit according to the present invention may be used in other applications using household or industrial current and voltage levels. For instance, the switch 75 could detect any of a number of conditions, such as gas flow, temperature (with a thermal switch), the open or closed state of an enclosure or movement of another physical object, to name but a few.

The foregoing description, while including many specificities, is intended to be illustrative of the general nature of the invention and not limiting. It will be appreciated that those skilled in the art can, by applying current knowledge, readily modify and/or adapt the specific embodiments described above for various applications without departing from the spirit and scope of the invention, as defined by the appended claims and their legal equivalents.

What is claimed is:

1. An apparatus for sensing fluid flow in a conduit, comprising:
   a valve which prevents passage of fluid in a closed state, and which allows passage of fluid in an open state;
   a magnetic shield attached to the valve; and
   circuit associated with the valve, such that the circuit senses the open or closed state of the valve based on a relative position of the magnetic shield.

2. The apparatus of claim 1, wherein the circuit includes a Hall effect sensor.

3. The apparatus of claim 2, wherein the Hall effect sensor is biased in an on state by a magnet, wherein the magnetic shield substantially neutralizes the magnet when the valve is in a closed state.

4. The apparatus of claim 1, wherein the valve is a flapper valve.

5. The apparatus of claim 1, wherein the sensor is a reed switch.

6. The apparatus of claim 5, wherein the reed switch is maintained in an open state by a magnetic shield, wherein the magnetic shield substantially neutralizes the magnet when the valve is in a closed state, and the magnetic shield does not substantially neutralize the magnet when the valve is in an open state.

7. The apparatus of claim 1, wherein the sensor circuit includes a sensor housed in a casing located within the conduit.

8. The apparatus of claim 7, wherein the casing is provided with threads to cooperate with a threaded hole in a wall of the conduit.

9. The apparatus of claim 3, wherein the Hall effect sensor, in the on state, provides a current to a means for supplying a voltage to a load.

10. The apparatus of claim 9, wherein the means for supplying a voltage includes a time delay circuit for delaying the supplying the voltage to the load, and wherein the load is an alarm.

11. A fluid flow alarm system, comprising:
    a valve which prevents passage of fluid in a closed state, and which allows passage of fluid in an open state;
    a magnetic shield attached to the valve; and
    a sensor circuit associated with the valve, such that the sensor circuit senses the open or closed state of the valve based on a relative position of the magnetic shield;
    a first voltage supply;
    a first trigger that detects the sensor's change of state thereby requiring operation of an alarm and generates a first trigger signal;
    a time controller for adjustably controlling the time required to generate the first trigger signal;
    second trigger that generates a second trigger signal in response to said first trigger signal;
    a switch for providing a load voltage to the alarm based upon said second trigger signal.

* * * * *